United States Patent
Ku et al.

(10) Patent No.: US 12,238,447 B2
(45) Date of Patent: Feb. 25, 2025

(54) BIAS LIGHTING EFFECT GENERATION FOR VIDEOS

(71) Applicants: Google LLC, Mountain View, CA (US); Bryan Ku, San Bruno, CA (US); Aileen Cheng, Cupertino, CA (US); Rick Maria Frederikus Van Mook, Mountain View, CA (US)

(72) Inventors: Bryan Ku, San Bruno, CA (US); Aileen Cheng, Cupertino, CA (US); Rick Maria Frederikus Van Mook, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 366 days.

(21) Appl. No.: 17/422,097

(22) PCT Filed: May 1, 2019

(86) PCT No.: PCT/US2019/030195
§ 371 (c)(1),
(2) Date: Jul. 9, 2021

(87) PCT Pub. No.: WO2020/222839
PCT Pub. Date: Nov. 5, 2020

(65) Prior Publication Data
US 2022/0116550 A1    Apr. 14, 2022

(51) Int. Cl.
*H04N 5/262*    (2006.01)
*G06T 5/00*    (2024.01)
*G06T 5/70*    (2024.01)

(52) U.S. Cl.
CPC .............. *H04N 5/2628* (2013.01); *G06T 5/70* (2024.01); *G06T 2207/10016* (2013.01)

(58) Field of Classification Search
CPC .................. H04N 5/2628; G06T 5/002; G06T 2207/10016
See application file for complete search history.

(56) References Cited

U.S. PATENT DOCUMENTS 9,307,148 B1 *  4/2016  Baldwin .............. H04N 23/683
11,284,053 B2 *  3/2022  Ghazaryan ......... G02B 27/1066
(Continued)

FOREIGN PATENT DOCUMENTS

CN    101931736    12/2010
CN    104202646    12/2014
(Continued)

OTHER PUBLICATIONS

International Search Report for Application No. PCT/US2019/030195, mailed on Sep. 12, 2019, 2 pages.
(Continued)

*Primary Examiner* — Oneal R Mistry
*Assistant Examiner* — Jongbong Nah
(74) *Attorney, Agent, or Firm* — DORITY & MANNING P.A.

(57) ABSTRACT

Systems and methods for generating a bias lighting effect are provided. A computer-implemented method can include obtaining a video comprising a plurality of video frames. For each of one or more video frames of the plurality of video frames, the method can include sampling an edge portion of the video frame. The edge portion can include a portion of the video frame adjacent to an edge of the video frame. The method can further include generating a bias lighting effect for the video frame. Generating the bias lighting effect can include inverting the edge portion across the edge and blurring the edge portion. The method can further include displaying the video frame concurrently with the bias light- (Continued)

ing effect for the video frame. The bias lighting effect can be displayed adjacent to the edge of the video frame.

20 Claims, 8 Drawing Sheets

(56) References Cited

U.S. PATENT DOCUMENTS

| | | | |
|---|---|---|---|
| 2003/0112368 A1 | 6/2003 | Oh | |
| 2011/0058100 A1* | 3/2011 | Muto | H04N 5/46 348/E7.003 |
| 2012/0307005 A1* | 12/2012 | Guzman | G06T 3/60 348/E13.064 |
| 2012/0327172 A1* | 12/2012 | El-Saban | G06T 7/174 348/14.02 |

FOREIGN PATENT DOCUMENTS

| | | |
|---|---|---|
| CN | 105049959 | 11/2015 |
| CN | 106561044 | 4/2017 |
| JP | H03251892 | 11/1991 |
| JP | 2014/146871 | 8/2014 |

OTHER PUBLICATIONS

International Preliminary Report on Patentability for application No. PCT/US2019/030195, mailed on Nov. 11, 2021, 11 pages.
Machine Translated Chinese Search Report Corresponding to Application No. 2019800934604 on Jan. 31, 2023.
Crist, "DreamScreen 4K review: The dream is real, but the reality is underwhelming—for now", https://www.cnet.com/reviews/dreamscreen-4k-starter-kit-review/, Oct. 2, 2018, retrieved Sep. 10, 2021, 9 pages.
KH, "Playing blurred video in background with GPUImage", https://www.cleveroad.com/blog/playing-blurred-video-in-background-with-gpuimage, Oct. 5, 2020, retrieved Sep. 10, 2021, 8 pages.
Stefanvd.net, "Turn Off The Lights", https://www.youtube.com/watch?v=WbHHVqGjhYM, retrieved on Sep. 10, 2021, 3 pages.
Youtube.com, "Ambivid player for Youtube", Oct. 1, 2016, https://www.youtube.com/watch?v=WbHHVqGjhYM, retrieved on Sep. 10, 2021, 5 pages.
Chinese Search Report Corresponding to Application No. 2019800934604 on Aug. 8, 2023.

\* cited by examiner

BIAS LIGHTING EFFECT GENERATION FOR VIDEOS

RELATED APPLICATIONS

The present application is based upon and claims the right of priority under 35 U.S.C. § 371 to International Application No. PCT/US2019/030195, filed May 1, 2019, the disclosure of which is hereby incorporated by reference herein in its entirety for all purposes.

FIELD

The present disclosure relates generally to generating bias lighting effects for videos. More particularly, the present disclosure relates to systems and methods that sample an edge portion of a video, invert the edge portion, and apply one or more visual modifications to generate an immersive bias lighting effect for the video.

BACKGROUND

As computing technology has advanced, mobile computing devices, such as smartphones, have provided the ability to watch videos across a wide variety of platforms and applications. For example, a person can watch movies stored locally on their smartphones; stream movies, television shows and other content from a multitude of complimentary and subscription-based services; access multimedia content available on the internet; etc. However, in a typical application, a video displayed on a display screen of a mobile computing device may only occupy a portion of the display screen due to a discrepancy between the aspect ratio of the display screen and the video, as well as the orientation of the display screen, such as whether the display screen is in a portrait or landscape orientation. In order to rectify this discrepancy, portions of a display screen that do not contain the video are often filled in solid blocks of color, such as black boxes surrounding the video in a graphical user interface in which the video is played. However, such solid blocks of color can result in a high contrast region between the edge of the video and the rest of the graphical user interface, which can lead to eye strain and fatigue for the viewer.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for displaying video. The computer-implemented method can include obtaining, by a computing system comprising one or more processors and one or more memory devices, a video comprising a plurality of video frames. For each of one or more video frames of the plurality of video frames, the method can include sampling, by the computing system, an edge portion of the video frame. The edge portion can include a portion of the video frame adjacent to an edge of the video frame. The method can further include generating, by the computing system, a bias lighting effect for the video frame. Generating, by the computing system, the bias lighting effect can include inverting, by the computing system, the edge portion across the edge and blurring, by the computing system, the edge portion. The method can further include displaying, by the computing system, the video frame concurrently with the bias lighting effect for the video frame. The bias lighting effect can be displayed adjacent to the edge of the video frame.

Another example aspect of the present disclosure is directed to a computing system for displaying video. The computing system can include a display screen, one or more processors, and one or more tangible, non-transitory, computer-readable media that store instructions that when executed by the one or more processors cause the computing system to perform operations. The operations can include obtaining a video comprising a plurality of video frames. For each of one or more of the video frames of the plurality of video frames, the operations can further include sampling an edge portion of the video frame. The edge portion can include a portion of the video frame adjacent to an edge of the video frame. The operations can further include generating a bias lighting effect for the video frame. Generating the bias lighting effect can include inverting the edge portion across the edge and applying one or more visual modifications to the edge portion. The operations can further include displaying the video frame concurrently with the bias lighting effect for the video frame on the display screen. The bias lighting effect can be displayed adjacent to the edge of the video frame. The one or more visual modifications can include one or more of: a blurring effect, an enlarging effect, a stretching effect, and an opacity effect.

Another example aspect of the present disclosure is directed to one or more tangible, non-transitory, computer-readable media that collectively store instructions that, when executed by one or more processors, cause the one or more processors to perform operations. The operations can include obtaining a video comprising a plurality of video frames. For each of one or more of the video frames of the plurality of video frames, the operations can further include sampling an edge portion of the video frame. The edge portion can be a portion of the video frame adjacent to an edge of the video frame. The operations can further include generating a bias lighting effect for the video frame. Generating the bias lighting effect can include inverting the edge portion across the edge and blurring the edge portion. The operations can further include displaying the video frame concurrently with the bias lighting effect for the video frame. The bias lighting effect can be displayed adjacent to the edge of the video frame.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
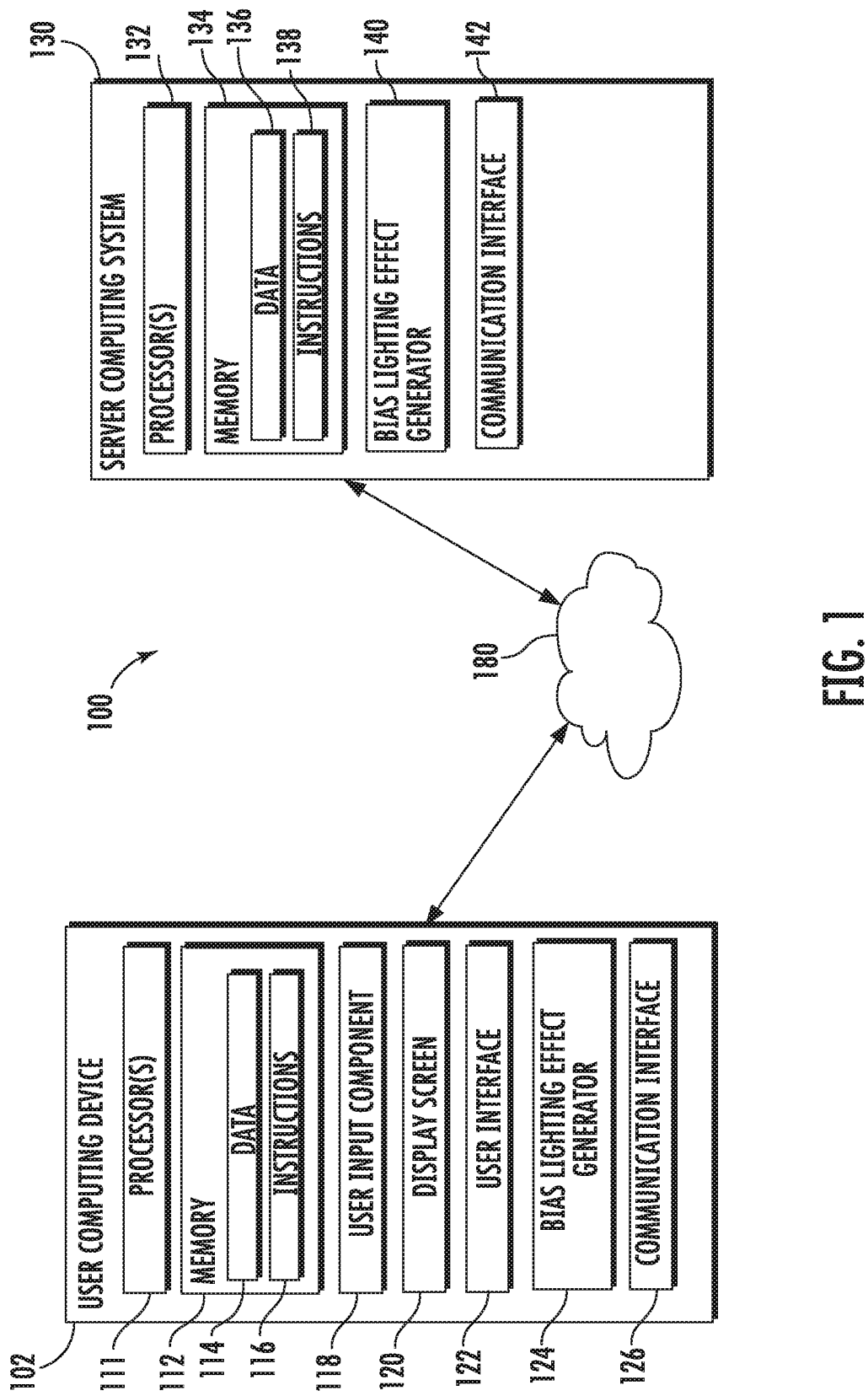
FIG. 1 depicts an example system for generating and displaying a bias lighting effect for a video according to example aspects of the present disclosure.

Reference numerals that are repeated across plural figures are intended to identify the same features in various implementations.

DETAILED DESCRIPTION

Generally, the present disclosure is directed to systems and methods that can generate and display a bias lighting effect for a video. For example, the systems and methods of the present disclosure can be implemented on a computing device, such as a user's smartphone, to display a video playing on the computing device concurrently with a bias lighting effect, such as in a graphical user interface displayed on a screen of the computing device. For example, a video can include a plurality of video frames, which can be obtained (e.g., accessed) by the computing device. For each of one or more video frames, the computing device can then sample an edge portion of the video frame. For example, the edge portion can be a portion of the video frame adjacent to an edge of the video frame. The computing device can then generate a bias lighting effect for each video frame. For example, the bias lighting effect can be generated by inverting the edge portion across the edge and blurring the edge portion. In some implementations, the edge portion can be stretched, enlarged, and/or made more or less opaque by the computing device in order to generate the bias lighting effect for each frame. The computing device can then display the video frame concurrently with the bias lighting effect for each respective frame. For example, the bias lighting effect can be displayed adjacent to the edge of the video frame from which the edge portion was sampled. For example, in some implementations, the bias lighting effect can be displayed without any additional visual delineation of the edge. For example, the bias lighting effect can be displayed beginning in the row or column of pixels immediately adjacent to the last row or column of pixels of the video frame. In some implementations, each video frame can be displayed concurrently with the respective bias lighting effect for the video frame without any type of border around the video frame, thereby allowing for a seamless transition from the video frame to the bias lighting effect. In turn, the seamless transition from the video frame to the bias lighting effect can ease eyestrain caused by the harsh contrast between the video frame and other portions of a display screen. In some implementations, the bias lighting effect for a video frame can be displayed adjacent to a border surrounding the respective video frame.

More particularly, the systems and methods of the present disclosure can allow for bias lighting effects to be generated and displayed in a variety of applications. For example, a computing system can obtain a video comprising a plurality of video frames. In some implementations, the video can be obtained by, for example, accessing a locally-stored video in a memory device of the computing system. In other implementations, the video can be obtained by, for example, downloading or streaming the video from a server computing device, such as via a communications network.

For each of one or more video frames, the computing system can sample an edge portion of the video frame. For example, in a typical application, a video frame can be in a generally rectangular configuration and can include a plurality of rows and columns of pixels (e.g., a 1080p video including 1,920×1,080 horizontal and vertical pixels). Thus, the video frame can include a top edge, a bottom edge, a right edge, and a left edge. In some implementations, the computing system can sample one or more edge portions for each frame. For example, in some implementations, a single row or column of pixels adjacent to an edge can be sampled to obtain the edge portion. In other implementations, a plurality of rows or columns adjacent to an edge can be sampled to obtain the edge portion.

For each of the one or more video frames, the computing system can then generate a bias lighting effect for the video frame. For example, the bias lighting effect can be generated by inverting the edge portion across the edge. As used herein, the term "inverting" refers to mirroring or reflecting the edge portion across the edge. As an example, for an edge portion comprising a plurality of pixel rows sampled from a top edge of a video frame, the edge portion can be inverted by flipping the edge portion vertically across the top edge. Similarly, for an edge portion comprising a plurality of columns sampled from a right edge of a video frame, the edge portion can be inverted by flipping the edge portion horizontally across the right edge. Thus, rows and/or columns of pixels of an edge portion which were sampled from an interior region of a frame closest to the center of the frame will be furthest from the center once inverted across the edge, whereas rows and/or columns of pixels of an edge portion that were sampled from a region closest to the edge will be closest to the edge once inverted across the edge.

According to additional aspects of the present disclosure, in some implementations, the computing system can further generate the bias lighting effect for the video frame by blurring the edge portion. For example, the computing system can apply one or more blurring algorithms to the edge portion in order to blur the edge portion. In some implementations, blurring the edge portion can include performing a Gaussian blur on the edge portion.

In some implementations, generating the bias lighting effect for the video frame can include stretching the edge portion. For example, the edge portion can be stretched by expanding the edge portion in a vertical direction or a horizontal direction. As an example, the edge portion can be stretched in the vertical direction according to a 2:1 ratio by doubling each row of the edge portion. Accordingly, in implementations in which a display field for displaying the bias lighting effect is smaller than the stretched edge portion, generating the bias lighting effect can include cropping the edge portion to the size of the display field. Further, in some implementations, the size of the display field for the bias lighting effect can be adjusted to the size of the stretched edge portion.

In some implementations, generating the bias lighting effect for the video frame can include enlarging the edge portion. For example, the edge portion can be enlarged by expanding the edge portion in both the vertical direction and the horizontal direction. As an example, the edge portion can be enlarged in both the vertical direction and the horizontal direction according to a 2:1 ratio by doubling each row and each column of the edge portion. Accordingly, in implementations in which a display field for displaying the bias lighting effect is smaller than the enlarged edge portion, generating the bias lighting effect can include cropping the edge portion to the size of the display field. Further, in some implementations, the size of the display field for the bias lighting effect can be adjusted to the size of the enlarged edge portion.

In some implementations, generating the bias lighting effect for the video frame can include adjusting the opacity of the edge portion (e.g., applying an opacity effect). For example, the opacity of the edge portion can range from completely opaque (e.g., 100%) to at least partially transparent (e.g., >0%). As an example, the computing system can adjust the opacity of the edge portion to partially transparent (e.g. 50%) to allow a background area of a display field to be partially visible when the edge portion is displayed.

In some implementations, the bias lighting effect can be generated based at least in part on one or more user preferences. For example, in some implementations, a user can indicate one or more user preferences in a user interface. For example, a user interface can include a blur setting configured to select an amount of blur to be applied to the edge portion, an enlargement setting configured to select an enlargement ratio, a stretch setting configured to select a stretch ratio, an opacity setting configured to select an opacity/transparency setting, and/or a sampling setting configured to select a size of an edge portion to be sampled (e.g., a number of rows or columns of pixels). In some implementations, the computing system can obtain the one or more user preferences by, for example, accessing the user preferences selected by a user in the user interface. The bias lighting effect can then be generated based at least in part on the one or more user preferences. In some implementations, the one or more user preferences can be selected on a first computing device (e.g., a user's smart phone), communicated to a second computing device (e.g., a server computing device), and the bias lighting effect can be generated by the second computing device based at least in part on the one or more user preferences.

In some implementations, a bias lighting effect can be generated for each video frame of a video. For example, the computing system can sample an edge portion of each video frame, and generate a bias lighting effect for each respective video frame, as disclosed herein. In some implementations, a bias lighting effect generated from a first video frame can be used for one or more other video frames. For example, one or more video frames can be selected according to a ratio (e.g., every other video frame), a bias lighting effect can be generated for each selected video frame as disclosed herein, and the bias lighting effect can be displayed for the selected video frame as well as one or more other video frames. For example, the bias lighting effect can be displayed for a second, subsequent video frame in addition to the first video frame.

The computing system can then display each video frame concurrently with the bias lighting effect generated for the video frame. For example, the bias lighting effect can be displayed adjacent to the edge of the video frame from which the edge portion was sampled. According to example aspects of the present disclosure, the bias lighting effect for a video frame can be displayed without any additional visual delineation of the edge to allow for a seamless transition from the video to the bias lighting effect.

For example, in some implementations, the video can be displayed in a graphical user interface displayed on a display screen. The display screen can be, for example, a display screen of a mobile computing device, such as a user's smart phone. The graphical user interface can include one or more display fields for displaying the video and one or more bias lighting effects. For example, in some implementations, the graphical user interface can include a first display field for displaying the video, and a second display field adjacent to an edge of the video (e.g., adjacent to the first display field). For example, a top display field can be positioned above a top edge of the first display field, a bottom display field can be positioned below a bottom edge of the first display field, a left display field can be positioned to the left of a left edge of the first display field, and/or a right display field can be positioned to the right of a right edge of the first display field. The top, bottom, left, and/or right display fields can be immediately adjacent to the first field (e.g., the next row or column of pixels immediately adjacent to the first display field) to allow for a seamless transition from the video displayed in the first display field to the respective bias lighting effect display field. In this way, the harsh contrast between an edge of a video and other portions of a display screen can be reduced and/or eliminated.

In some implementations, a graphical user interface can include a plurality of display fields for bias lighting effects. For example, in one implementation, a graphical user interface can be displayed in a portrait mode on a mobile computing device (e.g., smartphone). For example, a first display field can generally be in the middle of the graphical user interface such that the first display field extends from the left side to the right side of the display screen to allow for the video to be displayed from the left edge to the right edge of the display screen. Further, the graphical user interface can include a top display field positioned above a top edge of the first display field, and a bottom display field positioned below a bottom edge of the first display field. The computing device can generate a first bias lighting effect by sampling a first edge portion adjacent to the top edge, inverting the first edge portion, and applying one or more visual modifications to the first edge portion (e.g., blurring, stretching, enlarging, and/or adjusting the opacity of the first edge portion), and can generate a second bias lighting effect by sampling a second edge portion adjacent to the bottom edge, inverting the second edge portion, and applying one or more visual modifications to the second edge portion (e.g., blurring, stretching, enlarging, and/or adjusting the opacity of the second edge portion). The computing device can then display (e.g., play) each frame of the video in the first display field, and concurrently display the respective first bias lighting effect in the top display field and the respective second bias lighting effect in the bottom display field.

In some implementations, a graphical user interface can include a first display field for displaying a video, and a respective display field for displaying a bias lighting effect across each edge of the video. For example, the graphical user interface can include a top display field positioned above a top edge, a bottom display field positioned below a bottom edge, a left display field positioned to the left of a left edge, and a right display field positioned to the right of a right edge. Thus, in some implementations, one or more display fields may overlap (e.g., at a corner), and the computing system can transition from one bias lighting effect to another in the overlapping region by, for example, overlaying, blending, or fading between the bias lighting effects in the overlapping portion of the display fields.

In some implementations, the bias lighting effect for a video can be generated in real time. For example, in some implementations, displaying the video frame concurrently with the bias lighting effect can include playing the video on a display screen, such as a display screen of a computing device or computing system. For example, a video can be streamed to a user's smart phone and displayed in a graphical user interface of an application operating on the user's smart phone. According to additional aspects of the present disclosure, the bias lighting effect can be generated concurrently with playing the video on the display screen. For example, a graphics processor of a computing device can be configured to concurrently generate the bias lighting effect while the video is displayed on the display screen of the computing device. For example, in some implementations, a graphics processor of the computing device can generate the bias lighting effect for a frame t at the same time the frame t is displayed on a display screen of the computing device. In some implementations, a buffer can be used to temporarily store the bias lighting effect generated for one or more upcoming frames to be displayed at a future time. For example, while a frame t is displayed on the display screen of a computing device, a graphics processor of the computing device can be generating a bias lighting effect for a frame t+1, t+2, etc. The computing device can then display the bias lighting effect for the upcoming frame when the upcoming frame is displayed on the display screen. In this way, the bias lighting effect for a frame (e.g., a frame t, t+1, t+2, etc.) can be generated while the video is playing on a display screen.

In some implementations, the bias lighting effect generated for one or more frames can be stored to be accessed at a later time. For example, a computing system can generate a bias lighting effect for one or more frames of a video, and can store the bias lighting effect for each video frame in one or more memory devices. The computing system can then display the video frame concurrently with the bias lighting effect for each video frame by accessing the stored bias lighting effect for each video frame in the one or more memory devices. In some implementations, a first computing system (e.g., a server computing system) can generate the bias lighting effect for each frame of a video, store the bias lighting effect, such as in a temporary or non-temporary memory device, and can communicate the bias lighting effect to a second computing system (e.g., a user's mobile computing device), where the bias lighting effect can be displayed with the video. For example, the server computing device can generate a bias lighting effect for each frame of a video, store the bias lighting effects for each frame, and can stream the bias lighting effect to the user's mobile computing device with the video where both the video and the bias lighting effect for each frame can be concurrently displayed.

The systems and methods described herein provide a number of technical effects and benefits. For example, eye strain is a common problem among users of video display devices. This is particularly true when an area surrounding the video is dark, whereas the video is light, thereby creating a high contrast between the dark region and the light video. In addition, a dark surround to a video can negatively affect the ability of a viewer to perceive a contrast between light and dark objects within the video. The systems and methods according to example aspects of the present disclosure may serve to reduce eye strain and increase contrast perception for viewers of videos that are displayed on only part of a display screen. Moreover, in some implementations, the bias lighting effects described herein may be adjustable, which may allow the bias lighting effect to be optimized for a particular user.

Additionally, the bias lighting effect may serve to increase the immersiveness of the video for a user. For example, the bias lighting effects can be displayed in otherwise unused portions of a display screen while a video is playing. For example, when a video is displayed in a portrait orientation of a typical display screen of a mobile user computing device, such as a smart phone, a top portion and/or a bottom portion of the display screen are often not utilized. The systems and methods of the present disclosure can allow for such otherwise unused portions of a display screen to be used, creating a bigger, more immersive experience, while helping to reduce the eyestrain of the user.

Moreover, the systems methods of the present disclosure can allow for bias lighting effects to be generated both in real time as well as in advance for use at a future time. For example, the bias lighting effects for a video can be generated while the video is being played on a particular computing device, or the bias lighting effects for a video can be generated and stored to be accessed at a later time when the video is played. Thus, the systems and methods of the present disclosure can allow for bias lighting effects to be displayed in both computationally-constrained applications as well as in real-time, online applications.

The systems and methods of the present disclosure also provide improvements to computing technology. In particular, a computing system can obtain a video comprising a plurality of frames, such as by accessing a locally-stored video or downloading/streaming an externally-stored video. For each of one or more frames of the video, the computing system can sample an edge portion of the video frame. The edge portion can be a portion of the video frame adjacent to an edge of the video frame. The computing system can generate a bias lighting effect for the video frame. For example, the bias lighting effect can be generated by inverting the edge portion across the edge and applying one or more visual modifications to the edge portion. For example, the edge portion can be blurred, enlarged, stretched, or an opacity of the edge portion can be adjusted. The computing system can then display the video frame concurrently with the bias lighting effect for the video frame. The bias lighting effect can be displayed adjacent to the edge of the video frame, such as in a graphical user interface with a seamless transition from the video frame to the bias lighting effect or adjacent to a border of the video frame. In this way, the systems and methods of the present disclosure can allow for generating and displaying bias lighting effects in a variety of applications.

With reference now to the figures, example aspects of the present disclosure will be discussed in further detail. FIG. 1 depicts an example system 100 for generating and displaying a bias lighting effect for a video according to example aspects of the present disclosure. The system 100 can include a user computing device 102 and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 111 and a memory 112. The one or more processors 111 can be any suitable processing device (e.g., a processor core, a microprocessor, an ASIC, a FPGA, a controller, a microcontroller, etc.) and can be one processor or a plurality of processors that are operatively connected. The memory 112 can include one or more non-transitory, computer-readable storage mediums, such as RAM, ROM, EEPROM, EPROM, flash memory devices, magnetic disks, etc., and combinations thereof. The memory 112 can store data 114 and instructions 116 which are executed by the processor 111 to cause the user computing device 102 to perform operations.

The user computing device 102 can also include one or more user input components 118 that receive user input. For example, the user input component 118 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The computing device 102 can also include one or more display screens 120. The display screens 120 can be, for example, display screens configured to display various information to a user. In some implementations, the one or more display screens 120 can be touch-sensitive display screens capable of receiving a user input. In some implementations, the one or more display screens 120 can display a video for a user, such as a video comprising a plurality of video frames.

The computing device 102 can include one or more user interfaces 122. The user interfaces 122 can be used by a user to interact with the user computing device 102, such as to play videos on the user computing device 102 or to allow a user to input one or more user preferences. The user interfaces 122 can be displayed on a display screen 120. Example user interfaces 122 according to example aspects of the present disclosure will be discussed in greater detail with respect to FIGS. 2-6.

In some implementations, the user computing device 102 can store or otherwise include a bias lighting effect generator 124. The bias lighting effect generator 124 can generate a bias lighting effect for videos. For example, the bias lighting effect generator 124 can obtain a video comprising a plurality of video frames. For example, in some implementations, the video can be stored locally on the user computing device 102, such as in a memory 112. In some implementations, the bias lighting effect generator 124 can obtain the video from a server computing device 130, such as over a communication network 180. For example, the video can be streamed from the server computing device 130 to the user computing device 102.

The bias lighting effect generator 124 can then generate a bias lighting effect for one or more video frames. For example, the bias lighting effect generator 124 can sample an edge portion of a video frame. The edge portion can be a portion of the video frame adjacent to an edge of the video frame. For example, in some implementations, the edge portion can include a last row or column of pixels of the video frame adjacent to the edge.

The bias lighting effect generator 124 can then generate the bias lighting effect for the video frame. For example, the bias lighting effect generator 124 can first invert the edge portion across the edge. For example, for an edge portion comprising a plurality of pixel rows sampled from a top edge of a video frame, the edge portion can be inverted by flipping the edge portion vertically across the top edge. Similarly, for an edge portion comprising a plurality of columns sampled from a right edge of a video frame, the edge portion can be inverted by flipping the edge portion horizontally across the right edge. Thus, rows and/or columns of pixels of an edge portion that were sampled from an interior region of a frame closest to the center of the frame will be furthest from the center once inverted across the edge, whereas rows and/or columns of pixels of an edge portion that were sampled from a region closest to the edge will be closest to the edge once inverted across the edge.

The bias lighting effect generator can then apply one or more visual modifications to the edge portion. For example, in some implementations, the bias lighting effect generator 124 can blur the edge portion. For example, a blurring algorithm can be implemented on the edge portion, such as a Gaussian blur. In some implementations, the bias lighting effect generator can enlarge the edge portion by expanding the edge portion in both a vertical direction and a horizontal direction, as will be discussed in greater detail herein. In some implementations, the bias lighting effect generator 124 can stretch the edge portion by expanding the edge portion in a vertical direction or a horizontal direction, as will be discussed in greater detail herein. In some implementations, the bias lighting effect generator 124 can adjust an opacity of the edge portion to allow for a background to at least partially show through the edge portion, as will be discussed in greater detail herein.

In some implementations, the bias lighting effect generator 124 can generate a respective bias lighting effect for each video frame of the video. In some implementations, the bias lighting effect generator 124 can generate a bias lighting effect for each of one or more video frames of the plurality of video frames, such as, for example, according to a ratio (e.g., every other video frame).

In some implementations, the bias lighting effect for a video can be generated by the bias lighting effect generator 124 in real time. For example, in some implementations, a video can be played by the user computing device 102 and the video can be displayed on the display screen 120. For example, a video can be streamed from a server computing device 130 to a user computing device 102 (e.g., a user's smart phone) and displayed in a graphical user interface 122 of an application operating on the user's smart phone. According to additional aspects of the present disclosure, the bias lighting effect can be generated by the bias lighting effect generator 124 concurrently with playing the video on the display screen 120. For example, a graphics processor 111 of a user computing device 102 can be configured to concurrently generate the bias lighting effect while the video is displayed on the display screen 120 of the user computing device 102. For example, in some implementations, the bias lighting effect generator 124 of the user computing device 102 can concurrently generate and display the bias lighting effect for a frame t at the same time the frame t is displayed on a display screen 120 of the user computing device 102.

In some implementations, a buffer can be used to temporarily store the bias lighting effect generated for one or more upcoming frames to be displayed at a future time. For example, while a frame t is displayed on the display screen 120 of a user computing device 102, a graphics processor 111 of the user computing device 102 can be generating a bias lighting effect for a frame t+1, t+2, etc. The user computing device 102 can then display the bias lighting effect for the upcoming frame when the upcoming frame is displayed on the display screen 120. In this way, the bias lighting effect for a frame (e.g., a frame t, t+1, t+2, etc.) can be generated while the video is playing on a display screen.

In some implementations, the bias lighting effect generated by a bias lighting effect generator 124 for one or more frames can be stored to be accessed at a later time. For example, a user computing device 102 can generate a bias lighting effect for one or more frames of a video, and can store the bias lighting effect for each video frame in the memory 112. The user computing device 102 can then display the video frame concurrently with the bias lighting effect for each video frame by accessing the stored bias lighting effect for each video frame in the memory 112.

The bias lighting effect generator 124 can include computer logic utilized to provide desired functionality. The bias lighting effect generator 124 can be implemented in hardware, firmware, and/or software controlling a general purpose processor. For example, in some implementations, the bias lighting effect generator 124 includes program files stored on a storage device, loaded into a memory 112 and executed by one or more processors 111. In other implementations, the bias lighting effect generator 124 includes one or more sets of computer-executable instructions that are stored in a tangible computer-readable storage medium such as RAM hard disk or optical or magnetic media.

The user computing device 102 can then display the generated bias lighting effect. For example, a video frame can be displayed on a display screen 120 of the user computing device 102. The bias lighting effect generated by the bias lighting effect generator 124 for a respective video frame can be concurrently displayed adjacent to the edge of the video frame from which the edge portion was sampled. For example, in some implementations, a user interface 122 can include a first display field for displaying the video, and at least a second display field adjacent to the edge for displaying the bias lighting effect. Example user interfaces 122 for concurrently displaying a video frame and an associated bias lighting effect according to example aspects of the present disclosure will be discussed in greater detail with respect to FIGS. 2-6.

In some implementations, one or more user preferences can be input on a user computing device 102, such as via a user interface 122, and the bias lighting effect generator 124 can generate a bias lighting effect based at least in part on the one or more user preferences.

The computing device 102 can further include a communication interface 126. The communication interface 126 can include any number of components to provide networked communications (e.g., transceivers, antennas, controllers, cards, etc.). In some implementations, the computing device 102 includes a first network interface operable to communicate using a short-range wireless protocol, such as, for example, Bluetooth and/or Bluetooth Low Energy, a second network interface operable to communicate using other wireless network protocols, such as, for example, Wi-Fi, and/or a third network interface operable to communicate over GSM, CDMA, AMPS, 1G, 2G, 3G, 4G, 5G, LTE, GPRS, and/or other wireless cellular networks.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The server computing system 130 can store or otherwise include a bias lighting effect generator 140. The bias lighting effect generator 140 can include the same or similar functionality as the bias lighting effect generator 124, as described herein. For example, in some implementations, the bias lighting effect generator 140 can generate a bias lighting effect for one or more video frames of a video, and can communicate the bias lighting effect and/or the associated video from the server computing device 130 to the user computing device 102 over a communication network 180.

In some implementations, the bias lighting effect generated by a bias lighting effect generator 140 for one or more frames can be stored to be accessed at a later time. For example, a server computing system 130 can generate a bias lighting effect for one or more frames of a video, and can store the bias lighting effect for each video frame in the memory 134. In some implementations, the server computing system 130 can generate the bias lighting effect for one or more frames of a video, store the bias lighting effect(s), such as in the memory 134, and can communicate the bias lighting effect to a second computing system (e.g., a user computing device 102), where the bias lighting effect can be displayed with the video. For example, the server computing system 130 can generate a bias lighting effect for each frame of a video, store the bias lighting effects for each frame, and can stream the bias lighting effect to the user computing device 102 with the video where both the video and the bias lighting effect for each frame can be concurrently displayed.

In some implementations, one or more user preferences can be input on a user computing device 102, such as via a user interface 122, and the one or more user preferences can be communicated to the server computing system 130 over communications network 180. The bias lighting effect generator 140 can then generate the bias lighting effect based at least in part on the one or more user preferences.

The server computing device 130 can further include a communication interface 142. The communication interface 142 can include any number of components to provide networked communications (e.g., transceivers, antennas, controllers, cards, etc.). In some implementations, the server computing device 130 includes a first network interface operable to communicate using a short-range wireless protocol, such as, for example, Bluetooth and/or Bluetooth Low Energy, a second network interface operable to communicate using other wireless network protocols, such as, for example, Wi-Fi, and/or a third network interface operable to communicate over GSM, CDMA, AMPS, 1G, 2G, 3G, 4G, 5G, LTE, GPRS, and/or other wireless cellular networks.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system 100 that can be used to implement the present disclosure. Other computing systems can be used as well. For example, in some implementations, the computing system 100 can include only a single computing device, such as user computing device 102. In such implementations, the server computing device 130 can include a display screen for displaying a video and associated bias lighting effects. Thus, certain functions performed by a first computing device or system as described herein can also be performed by a second computing device or system.

Figure 2:
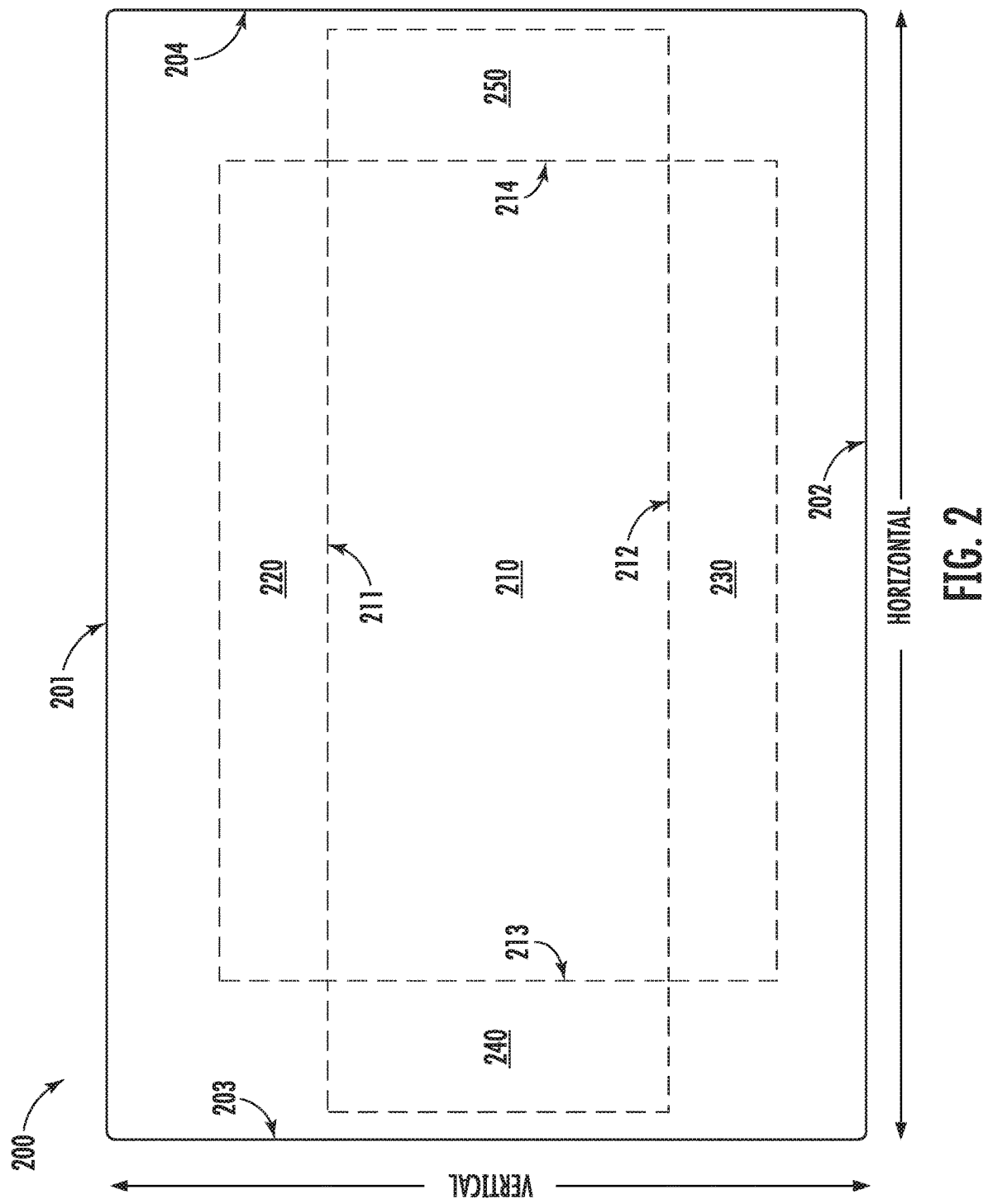
FIG. 2 depicts an example user interface according to example aspects of the present disclosure.

Referring now to FIG. 2, an example user interface 200 according to example aspects of the present disclosure is depicted. The user interface 200 depicted is just one example user interface for displaying videos and bias lighting effects. Other suitable user interfaces can similarly be used. Example user interface 200 can be displayed on a computing device or computing system, such as on a display screen 120 of a user computing device 102, as depicted in FIG. 1. As shown, a vertical direction can run from top side 201 of the user interface 200 to a bottom side 202 of the user interface 200, and a horizontal direction can run from a left side 203 of the user interface 200 to a right side 204 of the user interface 200.

As shown, user interface 200 can include a display field 210 for displaying a video. For example, as shown, display field 210 is generally in the center of a user interface 200. Display field 210 can be configured to display a video in a particular format. For example, in various implementations, display field 210 can be configured to display videos in one or more particular aspect ratios, such as 4:3, 16:9, 1.85:1, 2.39:1, etc. Videos in a variety of file formats can be displayed in display field 210, such as, for example, AVI, FLV, WMV, MOV, MPG, and/or other suitable file formats.

As shown, the display field 210 can include a plurality of edges 211-214. For example, a top edge 211 can be positioned at a top of the display field 210 (e.g., above the center of the display field 210 in the vertical direction), a bottom edge 212 can be positioned at a bottom of the display field 210 (e.g., below the center of the display field 210 in the vertical direction), a left edge 213 can be positioned on a left side of the display field 210 (e.g., left of the center of the display field 210 in the horizontal direction), and a right edge 214 can be positioned on a right side of the display field 210 (e.g., right of the center of the display field 210 in the horizontal direction). In some implementations, the edges 211 through 214 can correspond to, for example, the last respective row or column of pixels of a video displayed in the display field 210. In some implementations, the edges 211-214 can include or otherwise be a border, such as a solid border of a single color.

As shown, a user interface 200 can further include additional display fields for displaying one or more bias lighting effects. For example, as shown, a top display field is positioned above the top edge 211, a bottom display field 230 is positioned below the bottom edge 212, a left display field 240 is positioned to the left of the left edge 213, and a right display field 250 is positioned to the right of the right edge 214. Each display field 220-250 can be used to concurrently display a respective bias lighting effect for a particular video frame displayed in display field 210.

For example, a top bias lighting effect can be generated for the top display field 220 by first sampling a top edge portion adjacent to the top edge 211 of a video frame. For example, one or more rows of pixels at the top of a video frame can be sampled. A bias lighting effect corresponding to the top edge portion can then be generated by inverting the edge portion across the edge 211, and applying one or more visual modifications to the top edge portion, as disclosed herein. For example, one or more blurring effects, enlarging effects, stretching effects, and/or opacity effects can be applied to the top edge portion to generate the top bias lighting effect. The top bias lighting effect can then be displayed in the top display field 220.

Similarly, in some implementations, a bottom bias lighting effect can be generated for the bottom display field 230 by sampling, inverting, and applying one or more visual modifications to a bottom edge portion adjacent to the bottom edge 212, a left bias lighting effect can be generated for the left display field 240 by sampling, inverting, and applying one or more visual modifications to a left edge portion adjacent to the left edge 213, and a right bias lighting effect can be generated for the right display field 250 by sampling, inverting, and applying one or more visual modifications to a right edge portion adjacent to the right edge 214. In this way, in some implementations, a bias lighting effect can be generated for each edge of a video frame. In other implementations, a single bias lighting effect can be generated, two bias lighting effects can be generated (e.g., for a top edge and a bottom edge or a left edge and a right edge), and/or any number of bias lighting effects can be generated.

As shown, the top display field 220, the bottom display field 230, the left display field 240, and the right display field 250 do not overlap. However, in some implementations, one or more display fields 220-250 may overlap (e.g., at a corner). For example, the top display field 220 could extend all the way from the top edge 211 to the top side 201 of the user interface 200 in the vertical direction as well as from the left side 203 of the user interface 200 to the right side 204 of the user interface 200 in the horizontal direction. Similarly, a right display field 250 could extend all the way from the top side 201 of the user interface 200 to the bottom side 202 of the user interface 200, and from the right edge 214 to the right side 204 of the user interface 200. Thus, the top display field 220 and the right display field 250 would overlap in the top right corner of the user interface 200. In such an implementation, a computing system can transition from one bias lighting effect to another in the overlapping region by, for example, overlaying, blending, or fading between the bias lighting effects in the overlapping portion of the display fields 220 and 250.

Figure 3:
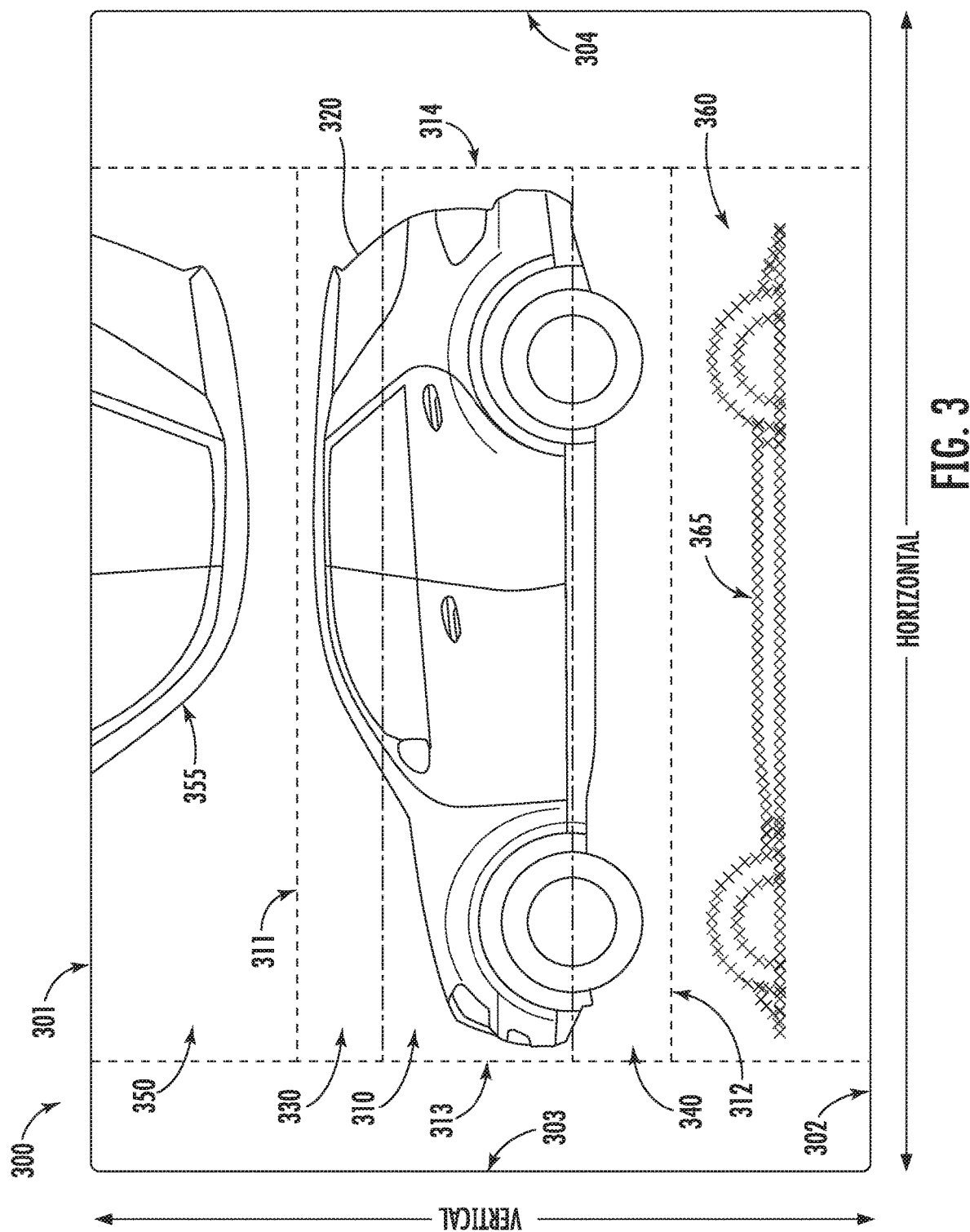
FIG. 3 depicts an example user interface with example inversion, stretching, and blurring visual modifications according to example aspects of the present disclosure.

Referring now to FIG. 3, an example user interface 300 according to example aspects of the present disclosure is depicted. The user interface 300 depicted is just one example user interface for displaying videos and bias lighting effects. Other suitable user interfaces can similarly be used. Example user interface 300 can be displayed on a computing device or computing system, such as on a display screen 120 of a user computing device 102, as depicted in FIG. 1. As shown, a vertical direction can run from top side 301 of the user interface 300 to a bottom side 302 of the user interface 300, and a horizontal direction can run from a left side 303 of the user interface 300 to a right side 304 of the user interface 300. FIG. 3 depicts some example visual modifications which can be applied to an edge portion to generate a bias lighting effect. For example, as described in greater detail below, the concepts of inverting, blurring, and stretching are depicted in FIG. 3.

A display field 310 can be used to display one or more frames of a video. For example, as depicted, a video frame depicting a vehicle 320 is displayed inside of the display field 310. Similar to display field 210 in FIG. 2, display field 310 can include a top edge 311, a bottom edge 312, a left edge 313, and a right edge 314.

According to example aspects of the present disclosure, one or more bias lighting effects can be generated for the video frame displayed in display field 310. For example, a top edge portion 330 can be sampled to generate a first bias lighting effect 355, and a bottom edge portion 340 can be sampled to generate a second bias lighting effect 365. Each of the edge portions 330 and 340 can include, for example, one or more rows of pixels adjacent to the respective edge 311 and 312. Further, as shown, first bias lighting effect 355 can be concurrently displayed with the video frame depicting the car 320 in a top display field 350, and second bias lighting effect 365 can be displayed in a bottom display field 360.

The first bias lighting effect 355 can be generated from the top edge portion 330. For example, as shown, first bias lighting effect 355 has been inverted across top edge 311 such that the first bias lighting effect 355 reflects a mirror image of the top edge portion 330. Further, the first bias lighting effect 355 has been stretched in the vertical direction. For example, as depicted, the first bias lighting effect 355 has been expanded in only the vertical direction to stretch the first edge portion 330 to fill in the top display field 350. In various implementations, the first bias lighting effect 355 can be expanded according to a ratio, a percentage, to fill a particular area, or according to a user preference input by a user. Thus, first bias lighting effect 355 has been generated by inverting the top edge portion 330 across the top edge 311 and stretching the top edge portion 330.

The second bias lighting effect 365 can be generated from the bottom edge portion 340. For example, as shown, second bias lighting effect 365 has been inverted across bottom edge 312 such that the second bias lighting effect 365 reflects a mirror image of the bottom edge portion 340. Further, the second bias lighting effect 365 has been blurred (as depicted by cross-hatched lines). For example, as depicted, a blurring visual modification has been applied to the inverted bottom edge portion 340 to generate the blurring effect (represented by cross-hatched lines). The blurring visual modification can be applied by, for example, applying one of any number of blurring techniques or blurring algorithms to the bottom edge portion 340. For example, in some implementations, a Gaussian blur algorithm can be used to blur the bottom edge portion 340. In other implementations, other suitable blurring algorithms can be used, such as a box blur (e.g., a box linear filter). Thus, second bias lighting effect 365 has been generated by inverting the bottom edge portion 340 across the bottom edge 312 and blurring the bottom edge portion 340.

Figure 4:
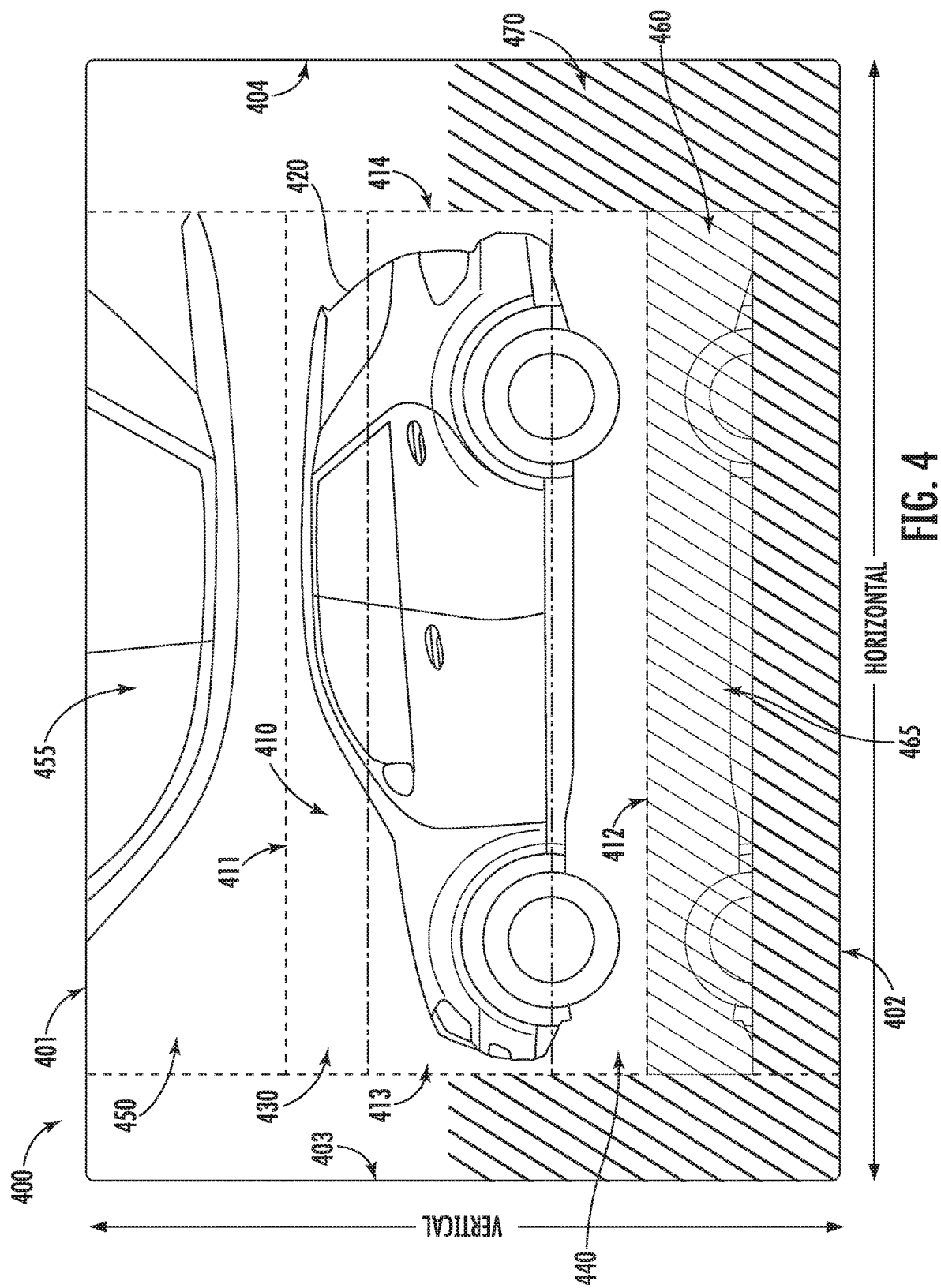
FIG. 4 depicts an example user interface with example inversion, enlarging, and adjusted opacity visual modifications according to example aspects of the present disclosure.

Referring now to FIG. 4, an example user interface 400 according to example aspects of the present disclosure is depicted. The user interface 400 depicted is just one example user interface for displaying videos and bias lighting effects. Other suitable user interfaces can similarly be used. Example user interface 400 can be displayed on a computing device or computing system, such as on a display screen 120 of a user computing device 102, as depicted in FIG. 1. As shown, a vertical direction can run from top side 401 of the user interface 400 to a bottom side 402 of the user interface 400, and a horizontal direction can run from a left side 403 of the user interface 400 to a right side 404 of the user interface 400. FIG. 4 also depicts some example visual modifications which can be applied to an edge portion to generate a bias lighting effect. For example, as described in greater detail below, the concepts of inverting, enlarging, and adjusting an opacity (e.g., applying an opacity effect) are depicted in FIG. 4.

A display field 410 can be used to display one or more frames of a video. For example, as depicted, a video frame depicting a vehicle 420 is displayed inside of the display field 410. Similar to display fields 210 in FIGS. 2 and 310 in FIG. 3, display field 410 can include a top edge 411, a bottom edge 412, a left edge 413, and a right edge 414.

According to example aspects of the present disclosure, one or more bias lighting effects can be generated for the video frame displayed in display field 410. For example, a top edge portion 430 can be sampled to generate a first bias lighting effect 455, and a bottom edge portion 440 can be sampled to generate a second bias lighting effect 465. Each of the edge portions 430 and 440 can include, for example, one or more rows of pixels adjacent to the respective edge 411 and 412. Further, as shown, first bias lighting effect 455 can be concurrently displayed with the video frame depicting the car 420 in a top display field 450, and second bias lighting effect 465 can be displayed in a bottom display field 460.

The first bias lighting effect 455 can be generated from the top edge portion 430. For example, as shown, first bias lighting effect 455 has been inverted across top edge 411 such that the first bias lighting effect 455 reflects a mirror image of the top edge portion 430. Further, the first bias lighting effect 455 has been enlarged (e.g., blown up, expanded, etc.) in both the vertical direction and the horizontal direction. For example, as depicted, the first bias lighting effect 455 has been enlarged in both the vertical direction and the horizontal direction to increase the first edge portion 430 to fill in the top display field 450. In various implementations, the first bias lighting effect 455 can be expanded according to a ratio, a percentage, to fill a particular area, or according to a user preference input by a user. Further, in order to fit within top display field 450, the inverted and enlarged first bias lighting effect 455 has been cropped to the size of the top display field 450. Thus, first bias lighting effect 455 has been generated by inverting the top edge portion 430 across the top edge 411 and enlarging the top edge portion 430.

The second bias lighting effect 465 can be generated from the bottom edge portion 440. For example, as shown, second bias lighting effect 465 has been inverted across bottom edge 412 such that the second bias lighting effect 465 reflects a mirror image of the bottom edge portion 440. Further, the second bias lighting effect 465 has had an opacity adjusted. For example, as depicted by the shaded region in FIG. 4, a background 470 of the user interface 400 can include a shaded area. However, as depicted, the display field 410 is opaque, and thus the background 470 is not visible in the display field 410. However, for the second bias lighting effect 465, the opacity of the bottom edge portion 440 has been adjusted to less than completely opaque (e.g., it is partially transparent), and thus the background 470 is allowed to show through the second bias lighting effect 465. The adjusted opacity modification can be applied by, for example, overlaying the background 470 with the second bias lighting effect 465. In various implementations, the second bias lighting effect 465 can be generated by adjusting the opacity of the bottom edge portion according to a ratio, a percentage, or according to a user preference input by a user. Thus, second bias lighting effect 465 has been generated by inverting the bottom edge portion 440 across the bottom edge 412 and adjusting the opacity of the bottom edge portion 440 (e.g., applying an opacity effect).

Figure 5:
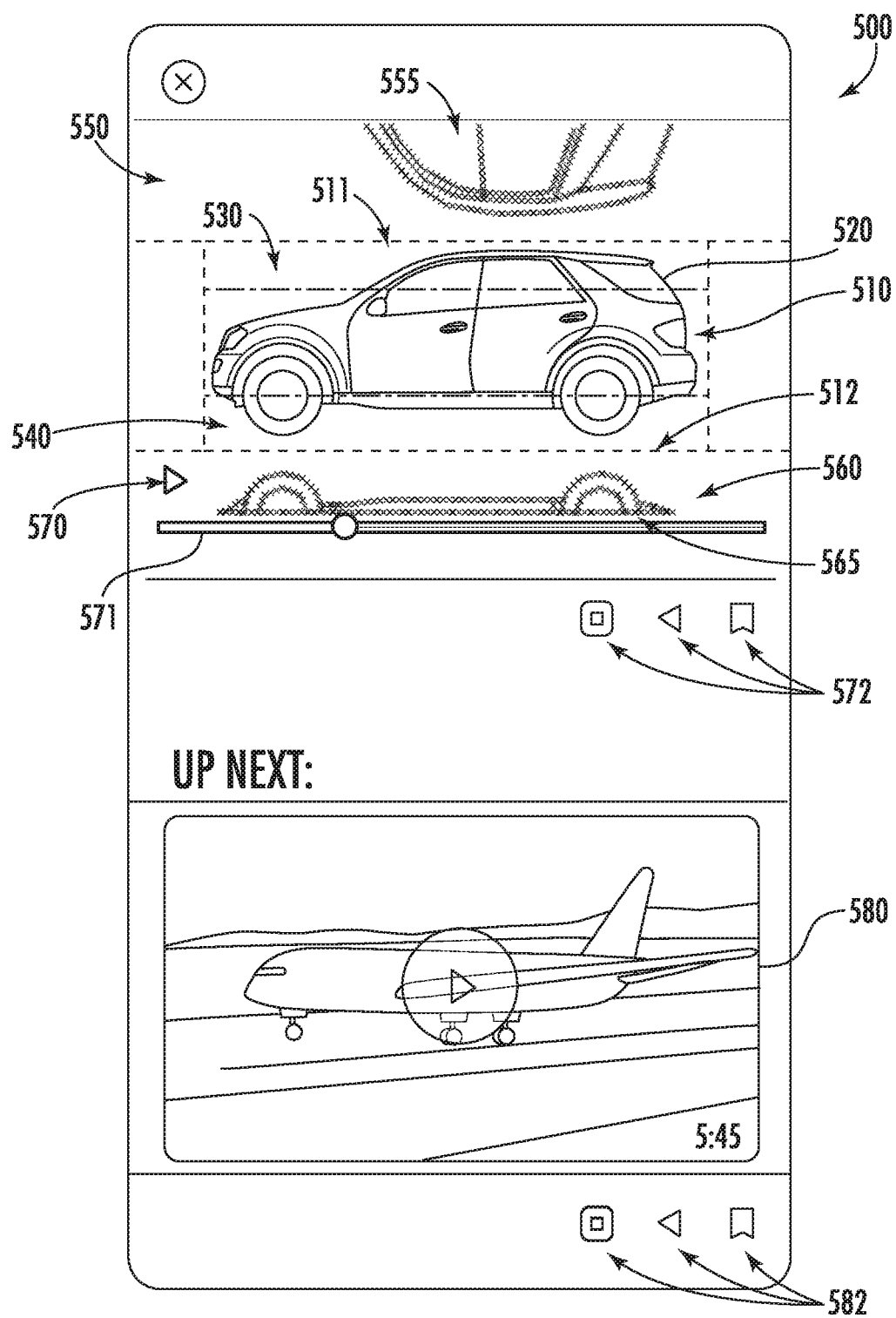
FIG. 5 depicts an example user interface for displaying a video with a bias lighting effect in a portrait mode on a mobile computing device according to example aspects of the present disclosure.

Referring now to FIG. 5, an example user interface 500 according to example aspects of the present disclosure is depicted. The user interface 500 depicted is just one example user interface for displaying videos and bias lighting effects. Other suitable user interfaces can similarly be used. Example user interface 500 can be displayed on a computing device or computing system, such as on a display screen 120 of a user computing device 102, as depicted in FIG. 1. For example, as shown, user interface 500 can be displayed on a display screen of a user computing device (e.g., a mobile computing device) in a portrait mode.

For example, as depicted, a video can be played in a display field 510 in the user interface 500. For example, as depicted, a video frame depicting a car 520 is displayed in the display field 510. Further, as depicted, a top bias lighting effect 555 is displayed in a top display field 550 adjacent to a top edge 511, and a bottom bias lighting effect 565 is displayed in a bottom display field 560 adjacent to a bottom edge 512. As depicted, top bias lighting effect 555 has been generated by inverting a top edge portion 530 across the top edge 511, and blurring (as represented by cross-hatched lines) and stretching the top edge portion 530, as disclosed herein. Further, bottom bias lighting effect 565 has been generated by inverting bottom edge portion 540 across bottom edge 512, and blurring the inverted bottom edge portion 540 (as represented by cross-hatched lines).

User interface 500 can also include various user control interfaces. For example, a play button 570 can be used to begin playing the video and/or pause the video, a progress slider bar 571 can be used to fast-forward or rewind the video, and other control buttons 572 can be used, for example, to bookmark a video, share the video, or perform other actions.

In some implementations, user interface 500 can include other fields for accessing other videos. For example, an up next field 580 can display a still video frame for a video queued up to play next. Other control buttons 582 can be used, for example, to bookmark the upcoming video, share the upcoming video, or perform other actions.

In some implementations, the user interface 500 can be used to access one or more videos stored locally on the user computing device. For example, the video played in the display field 510 can be stored locally on a user computing device, such as in a memory device of the user computing device. In some implementations, the video played in the display field 510 can be downloaded and temporarily stored on the user computing device, such as in a memory buffer. In some implementations, the bias lighting effects 555/565 can be generated while the video is being played in the display field 510. For example, the user computing device can generate and display the bias lighting effects as each video frame is displayed or in advance of displaying a particular video frame. In some implementations, the user interface 500 can be used to access one or more videos stored remotely from the user computing device. For example, a video queued up to play next displayed in the up next field 580 can be accessed by streaming or downloading the video from a server computing device. In some implementations, the bias lighting effects 555/565 displayed with a video in a display field 510 can also be downloaded from the server computing device, as disclosed herein.

Figure 6:
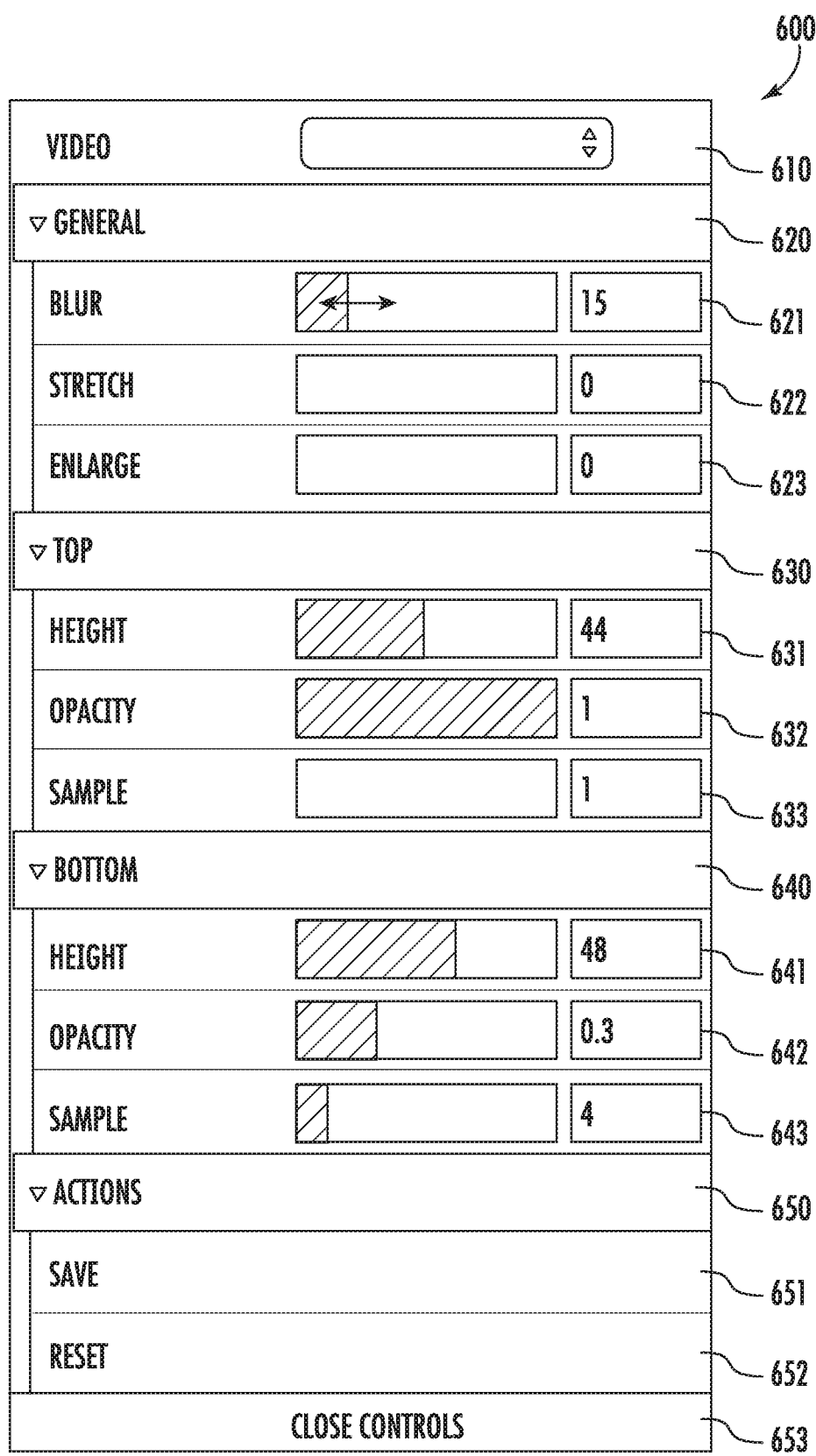
FIG. 6 depicts an example user interface for providing user preferences for a bias lighting effect according to example aspects of the present disclosure.

Referring now to FIG. 6, an example user interface 600 for obtaining one or more user preferences according to example aspects of the present disclosure is depicted. The user interface 600 depicted is just one example user interface for obtaining one or more user preferences. Other suitable user interfaces can similarly be used. Example user interface 600 can be displayed on a computing device or computing system, such as on a display screen 120 of a user computing device 102, as depicted in FIG. 1.

As depicted, user interface 600 can include a video selection field 610. For example, a user can select a video from a list in a drop-down box, and make one or more user preference selections specifically for that particular video. In some implementations, the videos can be stored on a particular user computing device, and in other implementations, the videos can be accessed from a remote competing device, such as by downloading or streaming the videos.

The user interface 600 can include one or more general settings 620. For example, the general settings 620 can be applied to all generated bias lighting effects. As shown, the general settings 620 can include a blur setting 621. As depicted, the blur setting can include a slider bar in which a user can adjust an amount of blur and/or a text field in which the user can enter a particular blur amount. In some implementations, adjusting either the slider bar or the text field can adjust the other of the slider bar or the text field. For example, sliding a slider bar can adjust the amount of blur displayed in the text field, or vice-versa. The blur setting can be represented in any number of ways, such as a type of blur, an amount of blur (e.g., a value, a percentage, a number of adjacent pixels to sample for blurring, etc.), or any other blur setting. For example, as shown, the slider bar and the text field are set to a blur setting of 15, which can represent a 15% blur.

Similarly, the general settings 620 can include a stretch setting 622. The stretch setting can similarly include a slider bar and/or a text field in which an amount of stretch can be input. In some implementations, the stretch setting can be, for example, a ratio, a number of pixels, a direction to stretch (e.g., vertical or horizontal), or other stretch setting.

The general settings 620 can further include an enlargement setting 623. The enlargement setting can similarly include a slider bar and/or a text field in which an amount of enlarging can be input. In some implementations, the enlargement setting can be, for example, ratio, a number of pixels, or other enlargement setting.

The user interface 600 can further include one or more display field-specific settings. For example, a top display field setting 630 can be used to adjust one or more visual modifications specific to the top display field.

For example, the top display field setting 630 can include a height setting 631. The height setting 631 can include a slider bar and/or a text field, and can be used to indicate a number of rows of pixels in which the top display field should occupy in a user interface. In some implementations, the height setting 631 can be represented in any number of ways, such as a percentage of an available display field in which the bias lighting effect is displayed. For example, as shown, the height setting 631 is set at a setting of 44, which can correspond to 44 rows of pixels.

The top display field setting 630 can further include an opacity setting 632. For example, the opacity setting 632 can include a slider bar and/or a text field, and can be used to set and opacity/transparency of the bias lighting effect. For example, an opacity setting 632 of 1.0, as shown, can be completely opaque and therefore not transparent such that a background overlay is not visible.

The top display field settings 630 can further include a sampling setting 633. The sampling setting 633 can include a slider bar and/or a text field, and can be, for example, used to select a number of rows of an edge portion to sample in order to generate a bias lighting effect. In some implementations, the sampling setting 633 can represent a percentage, or other value representative of an amount of an edge portion to sample. For example, the sampling setting 633 of 1, as shown, can correspond to an edge portion that includes a single row of pixels.

The user interface 600 can further include a bottom display field setting 640. The bottom display field setting 640 can be used to adjust one or more visual modifications specific to the bottom display field.

For example, the bottom display field setting 640 can include a height setting 641. The height setting 641 can include a slider bar and/or a text field, and can be used to indicate a number of rows of pixels in which the bottom display field should occupy in a user interface. In some implementations, the height setting 641 can be represented in any number of ways, such as a percentage of an available display field in which the bias lighting effect is displayed. For example, as shown, the height setting 641 is set at a setting of 48, which can correspond to 48 rows of pixels.

The bottom display field setting 640 can further include an opacity setting 642. For example, the opacity setting 642 can include a slider bar and/or a text field, and can be used to set an opacity/transparency of the bias lighting effect. For example, an opacity setting 642 of 0.3, as shown, can be partially transparent such that a background overlay is also partially visible.

The bottom display field settings 640 can further include a sampling setting 643. The sampling setting 643 can include a slider bar and/or a text field, and can be, for example, used to select a number of rows of an edge portion to sample in order to generate a bias lighting effect. In some implementations, the sampling setting 643 can represent a percentage, or other value representative of an amount of an edge portion to sample. For example, the sampling setting 643 of 4, as shown, can correspond to an edge portion that includes four rows of pixels.

The user interface 600 can also include one or more actions control buttons 650. For example, a save button 651 can be used to save (e.g., store) a current set of user preferences, such as in a memory device. In some implementations, the one or more user preferences can be saved and then transmitted to a remote computing device, such as a server computing device. For example, the one or more user preferences can be input in the user interface 600 displayed on a user computing device, and data indicative of the one or more user preferences can be communicated to the server computing device. A reset button 652 can be used to reset all user preferences to a default user preference. A close controls button 653 can be selected in order to close the user interface 600.

Figure 7:
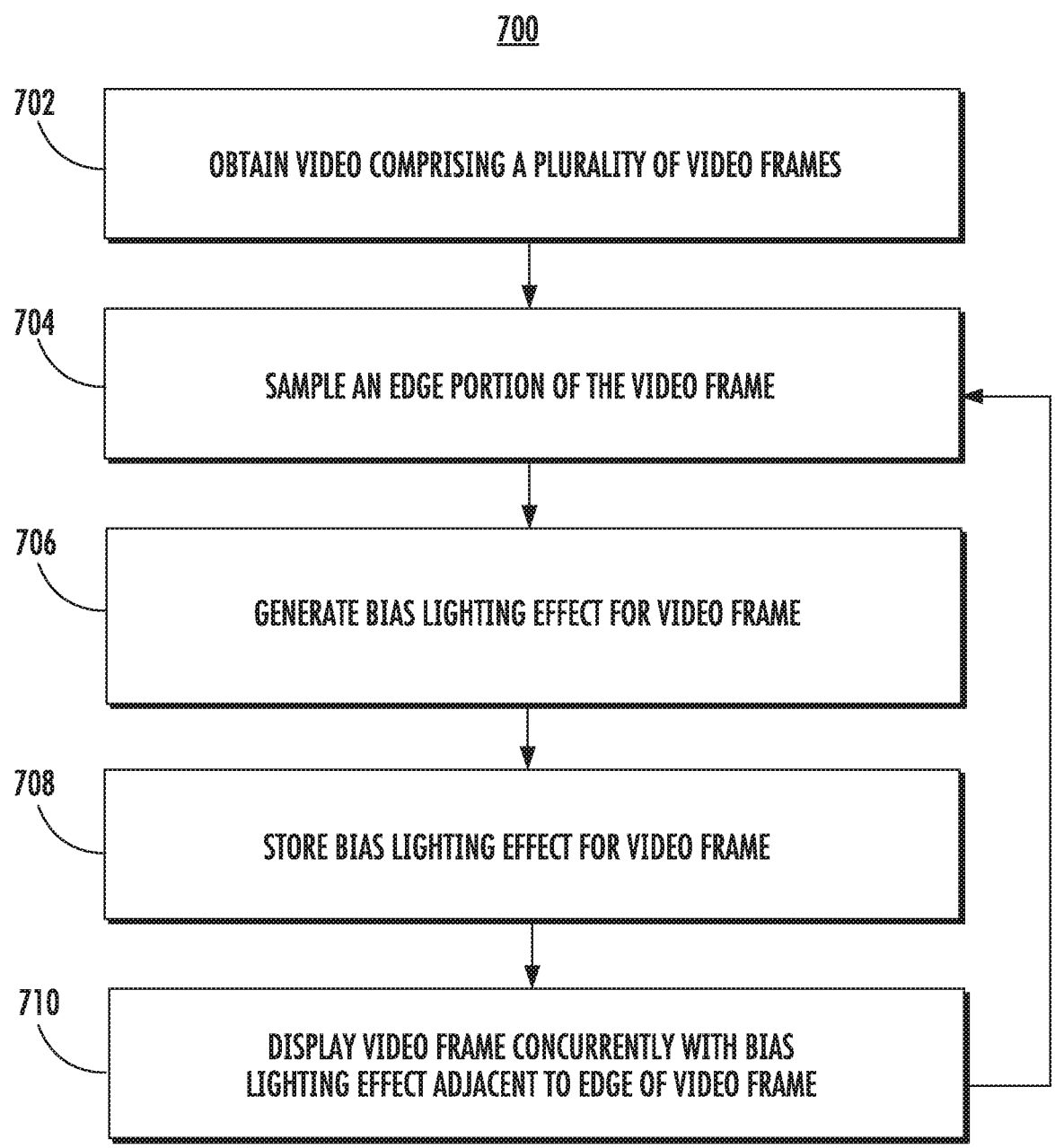
FIG. 7 depicts an example method for displaying a video with a bias lighting effect according to example aspects of the present disclosure.

Referring now to FIG. 7, a flow chart diagram of an example computer-implemented method 700 for displaying a video with a bias lighting effect according to example aspects of the present disclosure is depicted. The method 700 can be performed by, for example, a computing system comprising one or more processors and one or more memory devices, such as a computing system 100 depicted in FIG. 1. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, the method 700 can include obtaining a video comprising a plurality of video frames. For example, in some implementations, the video can be stored locally, such as in a memory device of a computing device. In some implementations, the video can be obtained from a first computing device to a second computing device, such as over a communications network.

For each of one or more video frames of the plurality of video frames, at 704, the method 700 can include sampling an edge portion of a video frame. For example, the edge portion can include a portion of the video frame adjacent to an edge of the video frame. For example, in some implementations, the edge portion can include one or more rows or one or more columns of pixels adjacent to an edge of the video frame.

Figure 8:
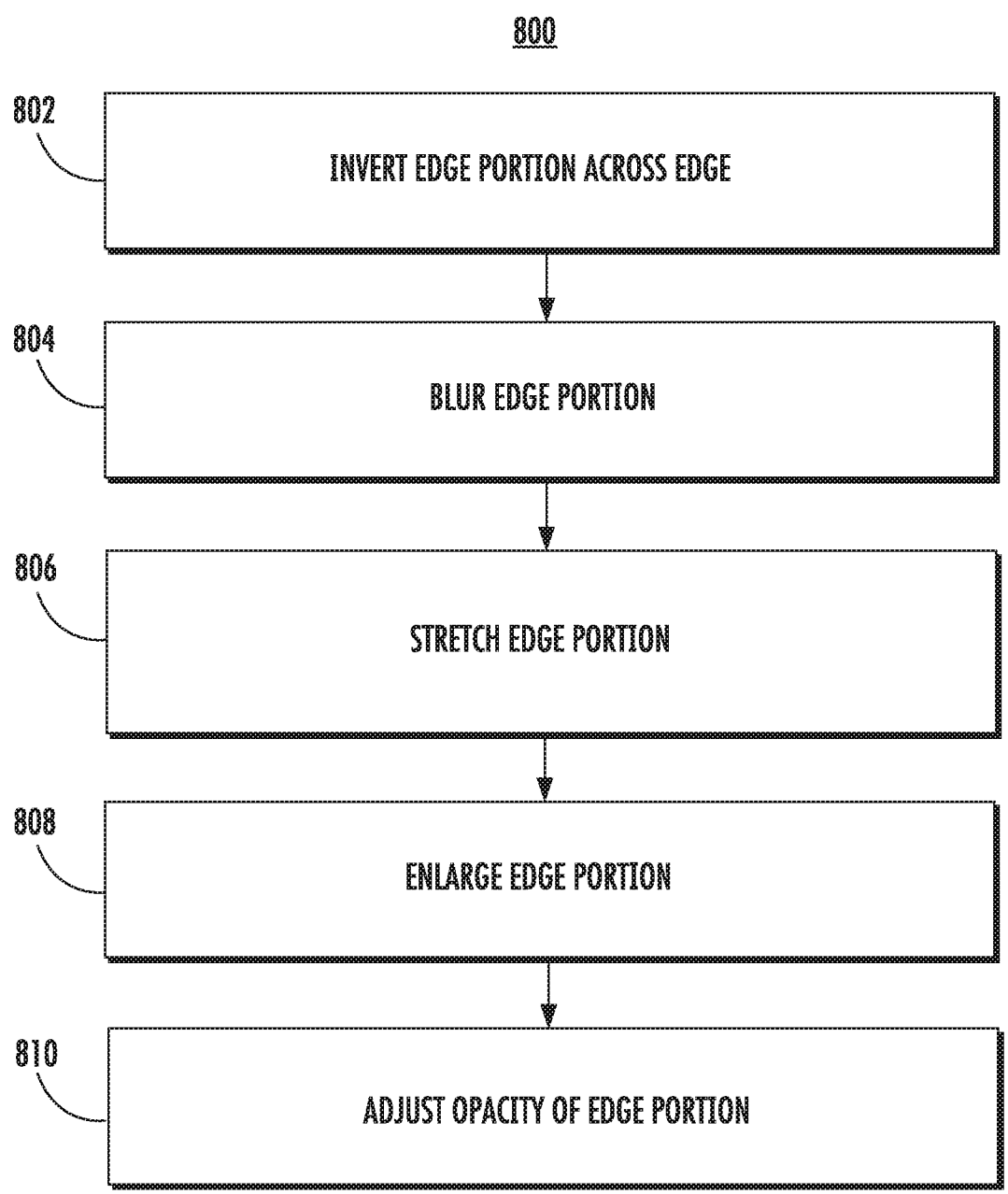
FIG. 8 depicts an example method for generating a bias lighting effect according to example aspects of the present disclosure.

At 706, the method 700 can include generating a bias lighting effect for the video frame. For example, referring now to FIG. 8, a flow chart diagram of an example method 800 for generating a bias lighting effect according to example aspects of the present disclosure is depicted. The method 800 can be performed by, for example, a computing system comprising one or more processors and one or more memory devices, such as a computing system 100 depicted in FIG. 1. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, the method 800 can include inverting the edge portion across the edge. For example, for an edge portion comprising one or more pixel rows sampled from a top edge of a video frame, the edge portion can be inverted by flipping the edge portion vertically across the top edge. Similarly, for an edge portion comprising one or more columns sampled from a right edge of a video frame, the edge portion can be inverted by flipping the edge portion horizontally across the right edge. Thus, rows and/or columns of pixels of an edge portion sampled from an interior region of a frame closest to the center of the frame will be furthest from the center once inverted across the edge, whereas rows and/or columns of pixels of an edge portion sampled from a region closest to the edge will be closest to the edge once inverted across the edge.

At 804, the method 800 can include blurring the edge portion. For example, one or more blurring algorithms can be applied to the edge portion in order to blur the edge portion. In some implementations, blurring the edge portion can include performing a Gaussian blur on the edge portion. In other implementations, other suitable blurring algorithms can be used, such as a box blur (e.g., a box linear filter).

At 806, the method 800 can include stretching the edge portion. For example, stretching the edge portion can include expanding the edge portion in a vertical direction or a horizontal direction. For example, in some implementations, an edge portion can be stretched in the vertical direction according to a 2:1 ratio by doubling each row of the edge portion.

At 808, the method 800 can include enlarging the edge portion. For example, enlarging the edge portion can include expanding the edge portion in both a vertical direction and a horizontal direction. For example, in some implementations, an edge portion can be enlarged in both the vertical direction and the horizontal direction according to a 2:1 ratio by doubling each row and each column of the edge portion.

At 810, the method 800 can include adjusting the opacity of the edge portion. For example, the opacity of the edge portion can range from completely opaque (e.g., 100%) to at least partially transparent (e.g., >0%). As an example, in some implementations, the opacity of an edge portion can be adjusted to partially transparent (e.g., 50%) to allow a background area of a display field to be partially visible when the edge portion is displayed.

In some implementations, a bias lighting effect generated for a video frame can be generated based at least in part on one or more user preferences. For example, one or more user preferences can be obtained, such as accessed via a memory device, or received as a communication over a communications network. In some implementations, the one or more user preferences can include one or more of a blur setting, an enlargement setting, a stretch setting, an opacity setting, and/or a sampling setting. For example, in some implementations, a user can input one or more user preferences in a user interface, such as a user interface 600 depicted in FIG. 6.

In some implementations, a plurality of bias lighting effects can be generated for a video frame. For example, a first bias lighting effect can be generated for a top edge portion, and a second bias lighting effect can be generated for a bottom edge portion. In some implementations, a respective bias lighting effect can be generated for each edge of the video frame.

In some implementations, a bias lighting effect for a first video frame (e.g., video frame t) can be used for a second video frame (e.g., video frame t+1). In some implementations, a bias lighting effect can be generated for one or more video frames according to a ratio. For example, in some implementations, a bias lighting effect can be generated for every other video frame in a video, and each bias lighting effect can be displayed for both the video frame from which the edge portion was sampled, as well as either a preceding or succeeding video frame. In some implementations, a bias lighting effect can be generated for each video frame in a video.

Referring back to FIG. 7, once a bias lighting effect for a video frame has been generated, at 708, the method 700 can include storing the bias lighting effect for the video frame. For example, in some implementations, the bias lighting effect generated for a video frame can be stored in one or more memory devices. In some implementations, the one or more memory devices can be one or more memory devices of a computing device which generated the bias lighting effect. In some implementations, the one or more memory devices can be one or more memory devices of a remote computing device, such as a server computing device. In some implementations, the bias lighting effect for a video frame can be accessed at a later time.

At 710, the method 700 can include displaying the video frame concurrently with the bias lighting effect for the video frame. For example, the bias lighting effect can be displayed adjacent to the edge of the video frame. In some implementations, the video can be displayed in a first display field, and the bias lighting effect can be displayed in a second display field adjacent to the edge from which the edge portion was sampled. In some implementations, the bias lighting effect can be displayed in the immediately adjacent row of pixels or columns in a user interface. In some implementations, the bias lighting effect can be displayed adjacent to a border of the video frame.

In some implementations, displaying the video frame concurrently with the bias lighting effect can include playing the video on a display screen, and concurrently generating and displaying the bias lighting effect for the video frame. For example, a graphics processor of a computing device can be configured to concurrently generate the bias lighting effect while the video is played on the display screen of the computing device. For example, in some implementations, a graphics processor of the computing device can generate the bias lighting effect for a frame t at the same time the frame t is displayed on a display screen of the computing device.

As shown, the steps 704-710 of the method 700 can be repeated for one or more frames. For example, after displaying the video frame concurrently with the bias lighting effect adjacent to the edge of the video frame, the method 700 can include returning to step 704 for one or more subsequent video frames.

In some implementations, a buffer can be used to temporarily store the bias lighting effect generated for one or more upcoming frames to be displayed at a future time. For example, while a frame t is displayed on the display screen of a computing device, a graphics processor of the computing device can be generating a bias lighting effect for a frame t+1, t+2, etc. The computing device can then display the bias lighting effect for the upcoming frame when the upcoming frame is displayed on the display screen. In this way, the bias lighting effect for a frame (e.g., a frame t, t+1, t+2, etc.) can be generated while the video is playing on a display screen.

In some implementations, displaying the video frame concurrently with the bias lighting effect for the video frame can include accessing a stored bias lighting effect for the video frame. For example, the bias lighting effect for a video frame can be stored in one or more memory devices. In some implementations, a first computing system (e.g., a server computing system) can generate the bias lighting effect for each frame of a video, store the bias lighting effect, such as in a temporary or non-temporary memory device, and can communicate the bias lighting effect to a second computing system (e.g., a user's mobile computing device), where the bias lighting effect can be displayed with the video. For example, the server computing device can generate a bias lighting effect for each frame of a video, store the bias lighting effects for each frame, and can stream the bias lighting effect to the user's mobile computing device with the video where both the video and the bias lighting effect for each frame can be concurrently displayed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for displaying video, comprising:
   obtaining, by a computing system comprising one or more processors and one or more memory devices, a video comprising a plurality of video frames; and
   for each of one or more video frames of the plurality of video frames:
   sampling, by the computing system, an edge portion of the video frame, the edge portion comprising a portion of the video frame adjacent to an edge of the video frame;
   generating, by the computing system, a bias lighting effect for the video frame, wherein generating, by the computing system, the bias lighting effect comprises:
   inverting, by the computing system, the edge portion across the edge;
   enlarging the edge portion in a vertical direction and a horizontal direction; and
   blurring, by the computing system, the edge portion, wherein blurring the edge portion comprises performing a Gaussian blur on the edge portion; and
   displaying, on a graphical user interface by the computing system, the video frame concurrently with the bias lighting effect for the video frame, the bias lighting effect displayed adjacent to the edge of the video frame, wherein the graphical user interface comprises a first display field for displaying the video and a second display field for displaying the bias lighting effect.

2. The computer-implemented method of claim 1, wherein generating, by the computing system, the bias lighting effect further comprises stretching the edge portion, wherein stretching the edge portion comprises expanding the edge portion in a vertical direction or a horizontal direction.

3. The computer-implemented method of claim 1, wherein generating, by the computing system, the bias lighting effect further comprises adjusting an opacity of the edge portion.

4. The computer-implemented method of claim 1, wherein the edge comprises a top edge or a bottom edge, and wherein the edge portion is a row of pixels adjacent to the edge of the video frame.

5. The computer-implemented method of claim 1, wherein displaying, by the computing system, the video frame concurrently with the bias lighting effect for the video frame comprises displaying, by the computing system, the bias lighting effect adjacent to the edge of the video frame in a graphical user interface displayed on a display screen of the computing system.

6. The computer-implemented method of claim 1, wherein the graphical user interface is configured to display the video in a portrait mode;
   wherein sampling, by the computing system, the edge portion of the video frame comprises sampling a first edge portion adjacent to a top edge of the video frame and sampling a second edge portion adjacent to a bottom edge of the video frame;
   wherein generating, by the computing system, the bias lighting effect for the video frame comprises generating a first bias lighting effect for the first edge portion and generating a second bias lighting effect for the second edge portion; and
   wherein displaying, by the computing system, the video frame concurrently with the bias lighting effect for the video frame comprises displaying, by the computing system, the video frame concurrently with the first bias lighting effect adjacent to the top edge and the second bias lighting effect adjacent to the bottom edge in the graphical user interface.

7. The computer-implemented method of claim 1, wherein displaying, by the computing system, the video frame concurrently with the bias lighting effect for the video frame comprises playing the video on a display screen of the computing system; and
   wherein generating, by the computing system, the bias lighting effect for the video frame is performed concurrently with playing the video on the display screen of the computing system.

8. The computer-implemented method of claim 1, further comprising:
   storing, by the computing system, the bias lighting effect for each video frame in the one or more memory devices; and
   wherein displaying, by the computing system, the video frame concurrently with the bias lighting effect for the video frame comprises accessing, by the computing system, the stored bias lighting effect for each video frame.

9. The computer-implemented method of claim 1, wherein sampling, by the computing system, the edge portion of the video frame comprises sampling one or more rows of pixels or one or more columns of pixels adjacent to the edge of the video frame.

10. The computer-implemented method of claim 1, further comprising:
    obtaining, by the computing system, one or more user preferences, wherein the one or more user preferences comprise one or more of: a blur setting, an opacity setting, or a sampling setting; and
    wherein generating, by the computing system, the bias lighting effect for each respective video frame comprises generating the bias lighting effect for the respective video frame based at least in part on the one or more user preferences.

11. The computer-implemented method of claim 1, wherein the edge portion is enlarged by expanding the edge portion in both a vertical direction and a horizontal direction.

12. The computer-implemented method of claim 1, wherein the edge portion is a column of pixels adjacent to the edge of the video frame.

13. A computing system for displaying video, comprising:
    a display screen;
    one or more processors; and
    one or more tangible, non-transitory, computer-readable media that store instructions that when executed by the one or more processors cause the computing system to perform operations, the operations comprising:
    obtaining a video comprising a plurality of video frames;
    for each of one or more of the video frames of the plurality of video frames:
    sampling an edge portion of the video frame, the edge portion comprising a portion of the video frame adjacent to an edge of the video frame;
    generating a bias lighting effect for the video frame, wherein generating the bias lighting effect comprises:
    inverting the edge portion across the edge;
    enlarging the edge portion in a vertical direction and a horizontal direction; and
    blurring the edge portion, wherein blurring the edge portion comprises performing a Gaussian blur on the edge portion; and displaying, on a graphical user interface presented on the display screen, the video frame concurrently with the bias lighting effect for the video frame on the display screen, the bias lighting effect displayed adjacent to the edge of the video frame, wherein the graphical user interface comprises a first display field for displaying the video and a second display field for displaying the bias lighting effect.

14. The computing system of claim 13, wherein the computing system is configured to display the video frame concurrently with the bias lighting effect for the video frame on the display screen in a graphical user interface;
    wherein the graphical user interface comprises a first display field for displaying the video;
    wherein the edge comprises a top edge of the first display field, a bottom edge of the first display field, a left edge of the first display field, or a right edge of the first display field;
    wherein the graphical user interface further comprises a second display field for displaying the bias lighting effect; and
    wherein the second display field comprises a top display field positioned above the top edge, a bottom display field positioned below the bottom edge, a left display field positioned to the left of the left edge, or a right display field positioned to the right of the right edge.

15. The computing system of claim 13, wherein displaying the video frame concurrently with the bias lighting effect for the video frame comprises playing the video on the display screen; and
    wherein generating the bias lighting effect for the video frame is performed concurrently with playing the video on the display screen.

16. The computing system of claim 13, wherein the computing system comprises a mobile computing device.

17. One or more tangible, non-transitory, computer-readable media that collectively store instructions that, when executed by one or more processors, cause the one or more processors to perform operations, the operations comprising:
    obtaining a video comprising a plurality of video frames; and
    for each of one or more of the video frames of the plurality of video frames:
        sampling an edge portion of the video frame, the edge portion comprising a portion of the video frame adjacent to an edge of the video frame;
        generating a bias lighting effect for the video frame; wherein generating the bias lighting effect comprises:
            inverting the edge portion across the edge;
            enlarging the edge portion in a vertical direction and a horizontal direction; and
            blurring the edge portion, wherein blurring the edge portion comprises performing a Gaussian blur on the edge portion; and
        displaying, on a graphical user interface, the video frame concurrently with the bias lighting effect for the video frame, the bias lighting effect displayed adjacent to the edge of the video frame, wherein the graphical user interface comprises a first display field for displaying the video and a second display field for displaying the bias lighting effect.

18. The tangible, non-transitory computer-readable media of claim 17, wherein generating the bias lighting effect for the video frame further comprises enlarging the edge portion, stretching the edge portion, or adjusting an opacity of the edge portion;
    wherein enlarging the edge portion comprises expanding the edge portion in a vertical direction and a horizontal direction; and
    wherein stretching the edge portion comprises expanding the edge portion in a vertical direction or a horizontal direction.

19. The tangible, non-transitory computer-readable media of claim 17, wherein the operations further comprise:
    obtaining one or more user preferences, wherein the one or more user preferences comprise one or more of a blur setting, an enlargement setting, a stretch setting, an opacity setting, and a sampling setting; and
    wherein generating the bias lighting effect for each respective video frame comprises generating the bias lighting effect for the respective video frame based at least in part on the one or more user preferences.

20. The tangible, non-transitory computer-readable media of claim 17, wherein the operations further comprise:
    storing the bias lighting effect for each of the one or more video frames in the tangible, non-transitory computer-readable media.

* * * * *